United States Patent [19]

Pirlet

[11] 4,077,723
[45] Mar. 7, 1978

[54] METHOD OF MEASURING THICKNESS

[75] Inventor: Robert Alfred Pirlet, Embourg, Belgium

[73] Assignee: Centre de Recherches Metallurgiques-Centrum voor Research de Metallurgie, Brussels, Belgium

[21] Appl. No.: 624,838

[22] Filed: Oct. 22, 1975

[30] Foreign Application Priority Data

Oct. 24, 1974 Belgium .................................. 821452
May 28, 1975 Belgium .................................. 829619

[51] Int. Cl.² ...................... G01B 11/02; G01B 11/00
[52] U.S. Cl. ..................................... 356/163; 250/560; 356/167
[58] Field of Search ............... 356/156, 161, 163, 199, 356/209; 250/559; 250/560

[56] References Cited

U.S. PATENT DOCUMENTS

| | | | |
|---|---|---|---|
| 3,619,070 | 11/1971 | Pirlet | 356/156 |
| 3,736,063 | 5/1973 | Ohno et al. | 356/199 |
| 3,807,870 | 4/1974 | Kalman | 356/161 |

Primary Examiner—John K. Corbin
Assistant Examiner—Wm. H. Punter
Attorney, Agent, or Firm—Holman & Stern

[57] ABSTRACT

A method of measuring a dimension of a body, the method comprising: directing a beam of optical rays towards each of two points on the surface of the body at opposite sides of the body; forming rays reflected from the said points into two distinct reflected beams; directing the reflected beams towards a common plane by means of an optical system which causes the two resulting images to follow two respective straight lines, during displacement, two rows of photodiodes being arranged along the two respective straight lines; subjecting both rows of photodiodes to continuous and synchronized electronic scanning; starting a time counter when the scanning of one row of photodiodes detects a photodiode illuminated by an image; and stopping the counter when the scanning of the other row of photodiodes detects a photodiode illuminated by the other image, the time interval registered by the counter being representative of the said dimension.

2 Claims, 4 Drawing Figures

METHOD OF MEASURING THICKNESS

BACKGROUND OF THE INVENTION

The present invention relates to a method of measuring a dimension, such as the thickness of thick metallurgical products such as blooms, girders, and sections for example.

The thickness of thin metallurgical products, such as sheet or strip, is frequently measured by means of X-rays or gamma rays according to methods mainly based on absorption phenomena in the products to be measured.

As the thickness of the products to be measured increases, so also the absorption of X-rays and gamma rays increases. This results in the need to use more powerful rays on thicker products. Consequently, one is faced with a higher cost due to increased energy consumption and a certain amount of risk in view of the nature and the power of the rays used.

Moreover, it should be noted that the methods based on such absorption phenomena permit only the solid part of the products to be measured. Accordingly, when applied to pipes these methods permit the measurement of the thickness of the walls only and not the outside diameter. The same kind of difficulties is faced with Tee or channel sections or girders and in general with any products having hollow portions.

Furthermore, the results of measurements made in accordance with methods are influenced by the density of the product whose thickness is to be determined. This results in the necessity of applying such methods to, products which are as homogeneous as possible, with no internal faults such as blowholes and inclusions.

These circumstances tend to reduce the field of application of X-rays or gamma rays, which are found to be of practical interest only for measuring the thickness of thin materials. To remedy these inconveniences, in U.S. Pat. No. 3,619,070 I have already described a method in which on each side of the body whose thickness is to be measured one point is selected, the points being situated substantially on a common normal to the median plane of the body, the two points being such that the planes tangential to the sides of the body at these points are substantially parallel; a beam of optical rays is directed towards each of these two points and a high proportion of the rays reflected from each of the points is picked up in the form of two distincts beams, all the rays forming each of these beams are made parallel to each other, these two beams are then orientated towards a common plane, and the distance between the images resulting from the intersection of these beams with the said plane is measured, this distance being representative of the thickness to be measured.

The distance between the images resulting from the intersection of the beams from the body whose thickness is to be measured with the plane towards which they are oriented, may be measured in a number of ways. For example, this distance is measured by either locating a graduated reticle in the image plane, or causing such images to appear on a graduated screen, or even causing them to appear on a television screen subjected to electronic scanning.

The results thus obtained have been found to be quite satisfactory. However, in the case of a television screen with electronic scanning, one is using relatively expensive equipment whose performance is above all limited owing to lack of scanning linearity which results in a loss of accuracy.

SUMMARY OF THE INVENTION

An object of the present invention is to provide a method permitting these difficulties to be overcome and a measurement in digital form to be obtained directly.

This method is based on the idea of using photodiodes sensitive to optical radiation, instead of a television screen.

The method according to the present invention wherein one measures the distance between the above mentioned images is substantially characterised in that, to form said images, use is made of an optical circuit which is arranged to cause each of the said images to follow a respective straight trajectory while being displaced, a series of photodiodes is arranged along each of the two lines thus defined, continuous and synchronized electronic scanning of these photodiodes is performed, a time counter is started when the electronic scanning of one series of photodiodes detects the first photodiode illuminated by an image, and the counter is stopped when the electronic scanning of the other series of photodiodes detects the photodiode illuminated by the other image, the time interval registered by the time counter being representative of the dimension to be measured.

The results obtained were found to be quite satisfactory and particularly suitable for monitoring the thickness of thick metallurgical products such as blooms, girders, and sections.

In view of the interesting features of this method and the numerous possibilities of application, I have tried to increase its accuracy as far as possible. This was done on the basis of the following considerations. The accuracy of dimensional measurements carried out in the above described way depends in particular on the intensity of illumination of the photodiodes: the larger this intensity, the clearer is the signal resulting from the detecting operation. It frequently happens that each of the images designed to measure (for example) a thickness covers a plurality of photodiodes, which results in illumination varying from one photodiode to another and in less characteristic detection signals.

By taking into account these observations, I have devised an advantageous variation wherein the accuracy of the method according to the invention can be maintained even in the case where each of the images arranged to measure the dimension concerned such as a thickness covers several photodiodes. According to this variation, the time counter is started when the electronic scanning relative to one series of photodiodes detects the diode located in the middle of the illumination caused by an image, and the counter is stopped when the electronic scanning relative to the other series of photodiodes also detects the photodiode located in the middle of the illumination caused by the other image, this time interval being representative of the dimension to be measured.

BRIEF DESCRIPTION OF THE DRAWINGS

A more complete appreciation of the invention and the attendant advantages thereof will be more clearly understood by reference to the following detailed description in connection with the drawings wherein.

DETAILED DESCRIPTION OF A PREFERRED EMBODIMENT

Figure 1:
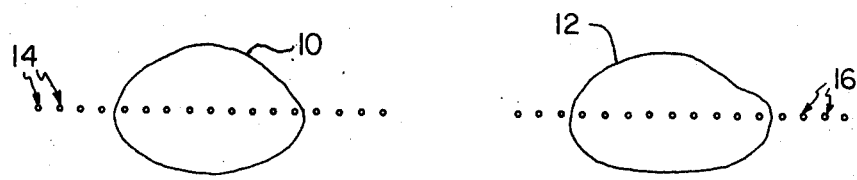
FIG. 1 is a top view showing the illumination of the photodiodes.
Figure 2:
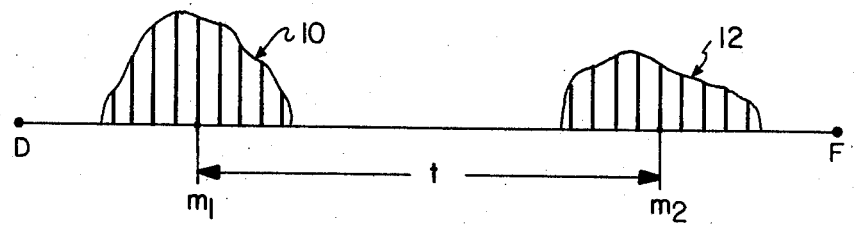
FIG. 2 is a time base schematic showing the time-wise relationship of the outputs of the photodiodes of FIG. 1.
Figure 3A:
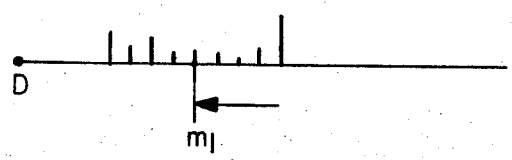
FIG. 3(a) is a time-wise schematic showing the relative strength of the diode's output in FIG. 1.
Figure 3B:
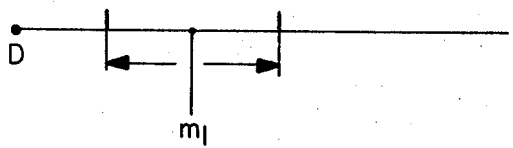
FIG. 3(b) is a time-wise schematic showing the mid-point of the image determination.

Referring now to the drawings wherein like reference numerals designate identical parts throughout the several views, FIG. 1 indicates two lines of photodiodes, 14 and 16, respectively, illuminated by images 10 and 12, respectively. FIG. 2 indicates the intensity illumination on each photodiode, illuminated by images 10 and 12. The mid-points of both illuminations are separated by the time $t$. The mid-point of image 10 in FIG. 2 is determined in FIG. 3 (a) by first determining the differences in signal intensity between adjacent pairs of diodes. From this, two impulses can be determined, as in FIG. 3 (b) which represent the beginning and the end of each image, and from which the median positions, $m_1$ and $m_2$ can be determined from images 10 and 12, respectively. Clearly, then, the time interval $t$ between initiation of counting action by a time counter (not shown) at point $m_1$ and termination of the counting action at point $m_2$ is indicative of the dimension to be measured.

According to a preferred modification of this variation, the diode located in the middle of the illumination caused by an image is detected while monitoring the signals corresponding to all the illuminated photodiodes and determining the difference in the signal intensity between adjacent pairs of diodes, which results in two impulses instead of $n$ impulses corresponding to the $n$ lightened diodes being obtained upon scanning the said image, the said two impulses respectively defining the beginning and the end of the image concerned. Each of the two images generates a pair of characteristic impulses and from these two pairs of impulses one can easily determine the median position of each of the two images.

The above description concerns the measurement of a thickness but by way of example only since the above described method may also be used for measuring other dimensions.

It should be understood that all the modifications described in the U.S. Pat. No. 3,619,070 mentioned above also apply to the present cases, although one is not dealing with a measurement proper of the distance between the images. These modifications are for example as follows:

1. Optical rays are focused on each of two points chosen to determine the thickness of the body to be measured, thereby permitting the incidence area for the rays to be reduced and the light energy density to be increased.

2. Monochromatic optical rays or laser beams are used, thereby permitting the beam reflected by the surface of the body to be more easily distinguished from the rays emitted by the body, e.g. by means of interference filters.

3. In order to reduce the intersection area of the reflected beams with the plane towards which they are orientated, the said beams are focused on the said plane.

4. The emission and reception axes of the optical rays located on both sides of the body are preferably symmetrical with respect to the median plane of the body normal to the direction of the dimension to be measured.

5. In the case where the body is at temperatures higher than the temperature of the ambient medium, an air stream is maintained on the path of the optical rays to the body to be measured and the rays reflected from it, so that the rays pass through a medium having a uniform refractive index.

This method makes available a means for measuring a dimension such as the thickness of a product and also has the following advantages:

high resolving power, low amount of consumed energy, high sensitivity, simple equipment comprising standard element.

I claim:

1. A method of measuring a dimension of a body, the method comprising: directing a beam of optical rays towards each of two points on the surface of the body at opposite sides of the body; forming rays reflected from the said points into two distinct reflected beams; directing the reflected beams towards a common plane by means of an optical system which causes the two resulting images to follow respective lines, two rows of photodiodes being arranged along the two respective lines; subjecting both rows of photodiodes to continuous and synchronized electronic scanning; starting a time counter when the scanning of one row of photodiodes detects the middle of the illumination caused by an image; and stopping the counter when the scanning of the other row of photodiodes detects the middle of the illumination caused by the other image, the time interval registered by the counter being representative of the said dimension.

2. A method as claimed in claim 1, in which the middle of the illumination caused by an image is detected by monitoring signals corresponding to all the illuminated photodiodes and determining the difference in the signal intensity between adjacent pairs of diodes which results in two impulses instead on $n$ impulses corresponding to the $n$ illuminated diodes being obtained upon scanning the said image, the said two impulses respectively defining the beginning and the end of the image concerned.

* * * * *